United States Patent [19]
Stich et al.

[11] Patent Number: 5,295,078
[45] Date of Patent: Mar. 15, 1994

[54] METHOD AND APPARATUS FOR DETERMINATION OF BATTERY RUN-TIME IN UNINTERRUPTIBLE POWER SYSTEM

[75] Inventors: Frederick A. Stich, Wisconsin Rapids; Edward G. Beistle, Appleton, both of Wis.

[73] Assignee: Best Power Technology Corporation, Madison, Wis.

[21] Appl. No.: 883,501

[22] Filed: May 15, 1992

Related U.S. Application Data

[63] Continuation-in-part of Ser. No. 702,733, May 17, 1991.

[51] Int. Cl.⁵ .............................................. G06F 15/20
[52] U.S. Cl. .................................... 364/483; 320/48; 340/636; 364/569
[58] Field of Search .................... 320/48; 340/636; 364/483, 569

[56] References Cited

U.S. PATENT DOCUMENTS

| | | | |
|---|---|---|---|
| 3,118,137 | 1/1964 | Vincent | 340/636 |
| 3,925,772 | 12/1975 | Miller et al. | 307/66 X |
| 4,388,615 | 6/1983 | Ford et al. | 307/66 X |
| 4,538,458 | 7/1985 | Nelson et al. | 307/64 |
| 4,703,193 | 10/1987 | Kawabata | 307/66 |
| 4,709,318 | 11/1987 | Gephart et al. | 363/37 |
| 4,779,050 | 10/1988 | Ohnari | 320/48 X |
| 4,876,513 | 10/1989 | Brilmyer et al. | 340/636 X |
| 5,057,697 | 10/1991 | Hammond et al. | 307/66 |
| 5,117,324 | 5/1992 | Johnson, Jr. | 361/66 |
| 5,148,043 | 9/1992 | Hirata et al. | 320/32 X |
| 5,182,518 | 1/1993 | Stich et al. | 307/66 X |

FOREIGN PATENT DOCUMENTS 903081396 1/1991 European Pat. Off. .

OTHER PUBLICATIONS

Paper entitled "Explanation of Run Time to Go Calculation Phase 3 MicroFerrups (Models MD350–MD2-KVA)", no date.

Primary Examiner—Edward R. Cosimano
Attorney, Agent, or Firm—Foley & Lardner

[57] ABSTRACT

The run-time on battery power available from an uninterruptible power system is accurately determined both during supply of power from the battery through an inverter to the load and during the time where power is supplied directly from an AC power system to the load. During power outages where power is supplied from the battery through the inverter to the load, the output voltage of the battery is directly measured as is the output current supplied to the load. The remaining run-time is determined utilizing the measured battery voltage, the measured output current, and system specifications including the full charge open circuit voltage of the battery, the allowable lower limit of battery voltage, and constants which are characteristic of the uninterruptible power supply and the battery. When power is supplied from the AC power system to the load, the open circuit voltage of the battery is measured initially, and then during the time that the battery is being recharged the open circuit battery voltage is calculated based on the initial open circuit voltage adjusted by a factor proportional to the time that the battery has been charged. The calculated open circuit voltage is used to calculate a battery voltage under load conditions by subtracting a term proportional to output current. These estimates are then utilized to calculate run-time in a manner similar to that used to calculate run-time when the battery is loaded. Thus, the inverter need not be turned on to supply power to the load solely for the purpose of testing the battery.

34 Claims, 6 Drawing Sheets

METHOD AND APPARATUS FOR DETERMINATION OF BATTERY RUN-TIME IN UNINTERRUPTIBLE POWER SYSTEM

CROSS REFERENCE TO RELATED APPLICATION

This application is a continuation-in-part of prior application Ser. No. 07/702,733, filed May 17, 1991, by Frederick A. Stich, et al., entitled Back-Up Uninterruptible Power System, the disclosure of which is incorporated herein by reference.

1. Field of the Invention

This invention pertains generally to the field of electrical power systems, and particularly to uninterruptible power supplies or systems which monitor system conditions such as remaining battery run-time.

2. Background of the Invention

Uninterruptible power supplies or systems (commonly referred to as UPS) are used to provide back-up power to critical loads such as computer systems where a loss of line power can result in the interruption of programs and the loss of valuable data. Uninterruptible power supplies may also provide a line power conditioning function to ensure that transient spikes, low-voltage conditions, or distorted power waveforms on the AC power system do not disturb the operation of the computer which is supplied with power through the UPS. Typically, the UPS includes a battery which is interfaced through an inverter to the AC output line. When a fault occurs in the input AC power, the inverter is controlled to provide power from the battery to the AC output line at the same frequency and with substantially the same waveform as the normal input AC power.

In double conversion UPS systems, the AC power is rectified to a DC voltage which is applied, in parallel with the battery voltage, to a constantly running inverter. If the line power fails, the output inverter continues to operate, but now delivers power from the back-up power source (usually a battery) to the critical load.

In UPS systems which utilize a ferroresonant transformer, the inverter need not be running constantly since power is normally delivered from the AC power mains through the ferroresonant transformer to the load, with the ferroresonant transformer providing transient filtering of input line power and some compensation of short power disturbances. Upon detection of a power outage or brown-out on the AC power lines, an AC switch can be opened to disconnect the primary of the ferroresonant transformer from the AC power mains, and an inverter is turned on to supply power from a battery to an auxiliary primary of the ferroresonant transformer which takes over the job of supplying the power to the load.

In certain other types of back-up power supplies, the AC power mains are normally connected directly to the load, and an inverter is turned on to supply power to the load typically only when the AC power mains fail. An advantage of such systems is that the direct connection of the AC power lines to the load during normal operation avoids energy loss in the auxiliary power supply and allows relatively less expensive and less complicated inverter components to be used since the inverter will be operated infrequently.

In all UPS systems which use a backup battery, the length of time during which the UPS can supply usable power from its battery to the load (the "run-time") is dependent on the state of charge of the battery and the power being drawn by the load. Since battery aging changes the characteristics of the battery, and the state of charge of the battery will decrease when power is drawn from it through the inverter and will increase as the battery is recharged, the remaining run-time of the battery is a highly variable parameter. Nonetheless, it is important to proper operation of the UPS that the available run-time be accurately estimated. For example, when the estimated run-time reaches a particularly low level during UPS operation, an orderly shut down of the load system (e.g., a computer) can be carried out rather than shutting down precipitously when the UPS fails for lack of battery power. It is also desirable to be able to estimate run-time when the inverter is not operating so that an operator can anticipate the length of a power outage that the UPS can handle. However, when the inverter is not running, the battery is not loaded and, in fact, it is usually being recharged, so that loaded battery voltage is not available.

One approach to determining available run-time which has been used previously in UPS which employ microprocessor control allows the run-time to be determined during normal supply of power from the AC power system by periodically disconnecting the load from the AC power system and supplying power from the battery through the inverter. Prior to carrying out the battery test, the microprocessor calculates output load power and determines a factor which will be used in the battery test. The power drawn by the load in output watts is calculated as the sum of the instantaneous product of the output voltage and output current over a cycle divided by the number of instantaneous samples acquired for a line cycle.

The UPS then switches to inverter power and measures the voltage of the battery The battery test calculates run-time during inverter operation as follows:

$$T_{IR} = \frac{K \times B_c \times (V_B - V_{LL})^2}{(V_{FC} - V_B) \times (P_{LD} + P_{LS})}$$

where:

$T_{IR}$ is the estimated remaining inverter run-time available from the battery, K is an experimentally determined constant, $B_C$ is the rated ampere hour capacity of the battery, $V_B$ is the measured DC output voltage from the battery, $V_{LL}$ is the predetermined low battery voltage set point at which the battery should no longer provide power, $V_{FC}$ is the full charge battery voltage, $P_{LD}$ is the calculated power drawn by the load in watts, and $P_{LS}$ is the loss in watts in the inverter.

The resulting run-time can be displayed to an operator or used to provide an indication if the run-time falls below a selected minimum value. As noted, this approach requires that the inverter be turned on periodically to allow the run-time to be calculated when power is being drawn from the battery. The same procedure can be used to estimate run-time when the AC power system has failed and the UPS is supplying power from the battery to the load.

SUMMARY OF THE INVENTION

In the present invention, the run-time on battery power in an uninterruptible power system is determined in a highly accurate manner both during supply of power from the battery through an inverter to the load and during normal operation where power is supplied directly from the AC power system to the load and the inverter is not supplying power from the battery. In the latter case, the run-time is estimated during charging of the battery without the need to periodically turn on the inverter to test the battery while it is supplying power to the load.

When power is supplied from the battery through the inverter to the load, such as during power outages on the AC power system, the output voltage from the battery is measured directly. Output current supplied to the load is also measured. The remaining run-time available from the battery is then determined in a procedure which utilizes the measured battery voltage, the measured output current (or an equivalent time such as output power or battery current), and system specifications including the full charge open circuit voltage of the battery, the allowable lower limit of battery voltage and constants which are characteristic of the UPS system and the battery. The expression for estimated run-time is structured to closely fit experimental data showing actual run-time available from the battery under various battery voltage and output current conditions. In the present invention, the expression for run-time includes the sum of a term which is dependent on output current (or power) and a term that is not, which more closely matches actual battery discharge characteristics than prior processes which used only a term dependent on output power. The resulting estimated run-time may be displayed to an operator or utilized to provide a low run-time indication if the run-time falls below a selected minimum, and may be further utilized to allow systematic shutdown of the load during UPS operation if the run-time drops below the selected minimum.

During normal operation of the UPS when power is being supplied from the AC power system to the load, and the battery is being charged using power from the AC power system, the actual output voltage from the battery will not be an indicator of the available run-time from the battery since the battery is not loaded. Moreover, the open circuit voltage of the battery is quite different if measured immediately after inverter operation than if measured after the battery has been charged for some period of time, even if the actual state of charge of the battery is the same in both cases Because of electrochemical effects occurring during charge and discharge operations, a considerable period of time would be required after these operations ceased before the battery open circuit voltage would stabilize. Since available run-time is most accurately determined based on battery conditions during inverter operation (i.e., during discharge of the battery), the run-time cannot be reliably estimated during line operation, and charging of the battery, by periodically measuring open circuit battery voltage. In the present invention, the open circuit voltage from the battery is measured initially immediately after inverter operation when the battery is not being charged. Then, during the time that the battery is being charged, the open circuit battery voltage is calculated based on the initial measured open circuit voltage adjusted by a factor proportional to the amount of time that the battery has been charged, based on the characteristics of the battery and the battery charger. The calculated open circuit voltage is then utilized to calculate a battery voltage under load conditions by subtracting a factor proportional to the output current from the calculated open circuit voltage. This factor is automatically adjusted by the system to account for changes in battery characteristics due to aging. The calculated battery voltage under load is then utilized to calculate run-time utilizing essentially the same expression as used to calculate run-time when power was supplied from the battery to the inverter. In this manner, the inverter need not be turned on to supply power to the load solely for the purpose of testing the battery, thereby minimizing power drain on the battery and minimizing potential interruptions of power to the load as a result of switching the inverter in and out of the system. The run-time determined in this manner accurately fits actual run-time measured experimentally.

The run-time determination in accordance with the invention will reflect any degradation of the battery as well as more accurately account for the state of charge during line operation than prior methods. The expression for run-time more accurately fits actual run-time data than prior methods, during both line operation and inverter operation. In addition, the run-time is determined to provide continuity of the run-time displayed to an operator or used for UPS control purposes during transitions from inverter to line operation and vice versa.

Further objects, features and advantages of the invention will be apparent from the following detailed description when taken in conjunction with the accompanying drawings.

DETAILED DESCRIPTION OF THE INVENTION

Figure 1:
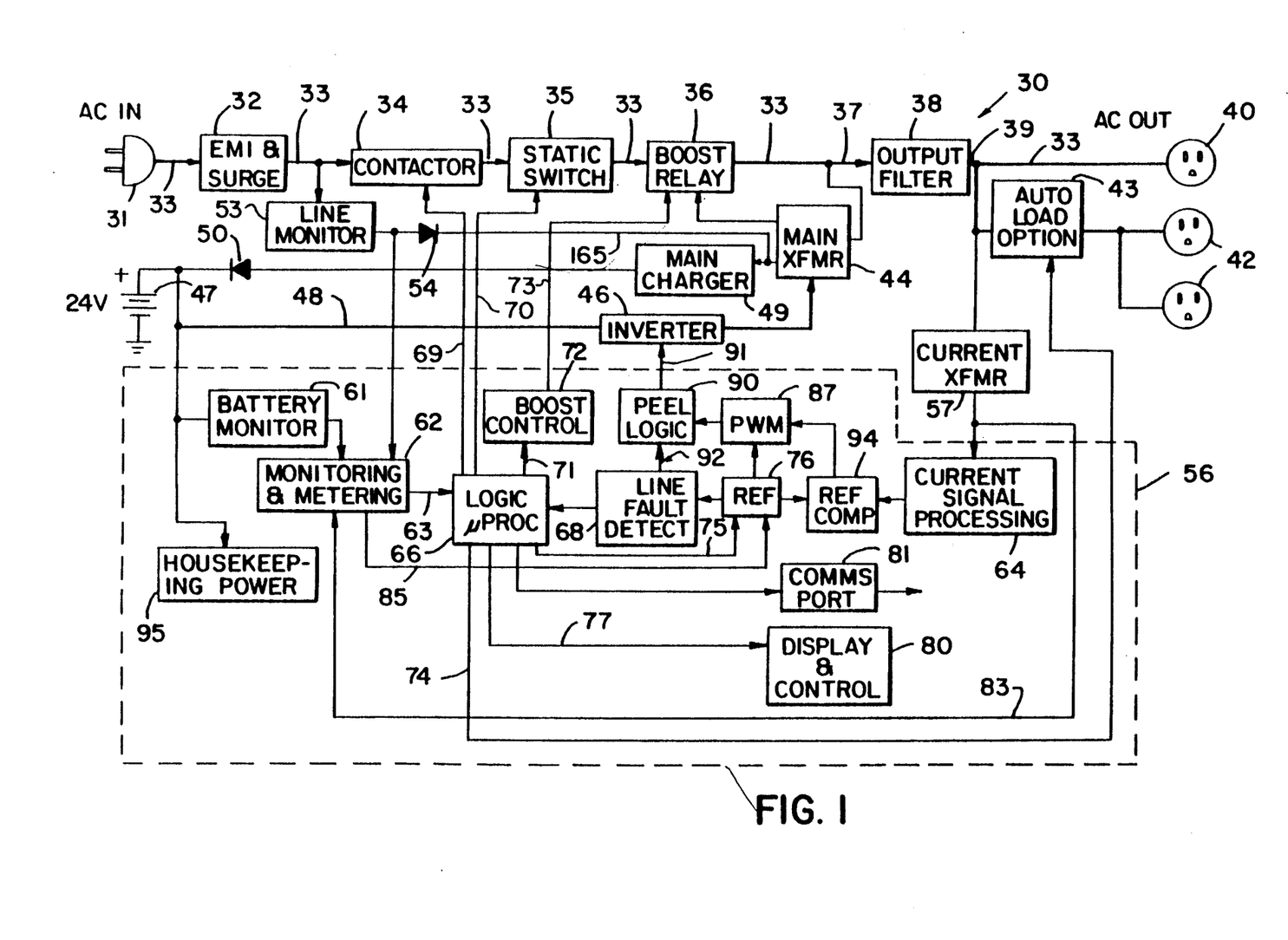
FIG. 1 is a block diagram of an exemplary uninterruptible power system which may incorporate the present invention.

With reference to the drawings, a block diagram which provides an overview of an exemplary uninterruptible power system (UPS) which incorporates the invention is shown generally at 30 in FIG. 1. This block diagram is somewhat simplified and illustrates the main functional units of the system and their interrelationship. It is understood that the present invention may be utilized in any type of UPS system to determine an estimate of remaining battery run-time. In the UPS 30, AC power is received from the lines of an AC power system (e.g., from power utility mains) at input terminals such as an inlet plug 31, and this AC power is provided to a power supply path 33 and is filtered by an electromagnetic interference (EMI) and surge suppression circuit 32. The filtered AC power is provided on a power supply path 33 serially through a contactor relay 34, a static switch 35, a boost relay 36, and an output filter 38 to AC output terminals 40 to which the critical load, e.g., a computer, is connected.

During normal supply of AC power to the power system input terminals 31, the relay contactor 34 and the static switch 35 are closed, providing electrical continuity therethrough and supplying AC power on the power supply path through the output filter 38 to the output terminals, the outlet 40. Additional slave AC outlets 42 may receive power from the output filter 38 through an auto load control circuit 43, if desired. The boost relay 36 cooperates with the main transformer 44 during low AC line voltage conditions to help boost the output voltage provided to the AC output terminals when the AC power has not completely failed, but is not providing a sufficiently high output voltage (a brown-out condition). When power from the AC power mains fails, an inverter 46 is turned on, and DC power is supplied to the inverter from an auxiliary power supply battery 47 on a DC bus 48. The inverter supplies AC voltage to the primary of the transformer 44, which then provides output power on the output line 37. To prevent backflow of power from the main transformer 44 to the failed AC power system, the static switch 35 is first turned off to cut the power flow through it before the inverter supplies power to the load, and then the relay contactor 34 is opened up to provide galvanic isolation of the transformer 44 from the AC power system.

The battery 47 (e.g., 24 volt storage battery) is preferably charged in two ways: first, from power supplied from the main transformer 44 wherein its primary now acts as a secondary, extracting power from the line 37 through a main charger 49 which is rectified, as by a diode 50, and supplied to the battery 47; and second, from the AC power system through a line monitor transformer 53 rectified by a rectifier 54 and provided on a line 165 to input of the main charger 49.

The line monitor 53 monitors the voltage from the AC power system after passing through the EMI filter and surge supressor 32 to allow a determination of when the AC power system has failed completely or when its voltage has dropped from nominal voltage levels. The signal from the line monitor 53 is passed to a system controller, shown within the dashed lines labeled 56 in FIG. 1. The controller 56 also receives a signal from a current transformer 57, which is connected to the output power lines 39, to provide the controller with information indicative of the current being delivered by the back-up power system 30 to the power consuming load equipment (the load current).

The controller 56 functions to monitor the condition of the system and to control its various components in reaction to system conditions. In addition to the line monitor 53 and the current transformer 57, a battery monitor 61 is used to monitor the voltage of the battery 47 and to provide a signal to the controller 56 indicating the measured voltage of the battery. The controller 56 includes a metering and monitoring circuit 62 which receives the signals from the battery monitor 61 and the line monitor 53, a current signal processing circuit 64 which receives the signal from the current transformer 57, a microprocessor system 66, with associated memory and input and output devices, which receives the signals from the monitoring circuit 62 and from a line-fault detection circuit 68 and provides control signals on lines 69 to the relay contactor 34, on a line 70 to the static switch 35, on a line 71 to a boost control circuit 72 which provides a drive signal on a line 73 to the boost relay 36, on lines 74 to the auto load circuit 43, and on lines 75 to a waveform reference generating circuit 76. The auto load sensing provided by the microprocessor 66 and the auto load option circuit 43 is an optional convenience feature that allows the user to have one on/off switch of a load which is connected to the UPS 30 automatically switch on ad off other loads connected to the user's UPS 30. The microprocessor 66 can communicate on input and output lines 77 to display and control circuits 80 (e.g., LED displays and a keyboard, with appropriate control and drive circuitry) which allow communication with the user, and through communication ports 81 to peripheral equipment. The output signal from the current transformer 57 is also provided on a line 83 to the metering and monitoring circuit 62 which provides its signal to the microprocessor on a line 63. The output of the monitoring and metering circuit 62 is also provided on a line 85 to the reference generating circuit 76. The output of the reference generating circuit 76 is provided to a reference compensation circuit 94, which in turn sends a signal to a pulse width modulator 87 which provides signals to a programmable logic (PEEL) circuit 90 which provides drive signals on lines 91 to the inverter 46. The PEEL logic 91 also receives a signal on a line 92 from the line fault detection circuit 68. The output of the reference generating circuit 76 is provided to the line fault detection circuit 68 and to a reference compensation circuit 94 which receives the output of the current signal processing circuit 64.

As is also shown in FIG. 1, a housekeeping power supply 95 receives power from the battery 47 or from the chargers supplying power to the battery, and provides the various levels of power required by the operating components of the system 30.

The controller 56 carries out the monitoring of the state of the backup uninterruptible power system 30 and control of its various components to achieve its objectives. Among these are determination of the run-time available from the inverter.

In the present invention, the remaining inverter runtime available from the battery is determined by the microprocessor 66 in accordance with the following procedures. During inverter operation, the following expression for run-time is used:

$$t_R(INV) = \left[ K_1 + \frac{K_2}{I_o(INV)} \right] \frac{(V_B - V_{LL})^2}{(V_{FC} - V_B)}$$

if $t_R(INV) < t_R(LINE)$ or actual run-time on inverter is less than 30 seconds;

otherwise $t_R(INV) = t_R(LINE)$ where:

$t_R(INV)$ = estimated run-time on inverter, usually expressed in minutes;

$K_1, K_2$, = constants for proportionality and for adjusting the relationship's dependence on load current;

$I_o(INV)$ = root mean square (RMS) inverter output load current in RMS amperes;

$V_B$ = battery terminal voltage;

$V_{LL}$ = lower limit of battery voltage (lowest voltage servicing full rated load or level below which damage to the battery could occur);

$V_{FC}$ = battery open-circuit, full-charge voltage;

$t_R(LINE)$ = run-time available on inverter, but estimated during line operation while battery is charging. In this context, it would be the last such value calculated just prior to inverter operation.

After line input power returns to acceptable quality and just prior to transfer from inverter to line, the values of $V_B(INV)$ and $I_o(INV)$ are measured and stored.

Immediately upon return to line, the battery charger is held off for a period of time so that the open-circuit battery voltage, $V_{B(OC)M}$, can be measured. The hold-off time can be, for example, 0.5 to 1.5 minutes. During the hold-off time, the run-time can be determined in two ways, each of which provides continuity with run-time estimated during inverter operation. The first option is simply to retain the last $t_R(INV)$ as the run-time to be displayed to the operator or used for UPS control during the holdoff period. The second option is to determine $t_R(LINE)$ in accordance with the expression given below for $t_R(LINE)$ by making the following calculation:

$$V_{B(OC)C} = V_B(INV) + K_3 I_o(LINE)$$

where:

$V_{B(OC)C}$ = calculated open-circuit battery voltage, $K_3$ = a previously calculated constant related to battery resistance, and $I_o(LINE)$ = measure output current during line operation.

Consequently, in the procedure below, $V_{BC}$ will be equal to $V_B(INV)$, the last measured battery voltage during inverter operation, and the value of $t_R(LINE)$ should be equal to the last value of $t_R(INV)$ unless the load current $I_o(LINE)$ changes from the last value of $I_o(INV)$. By this procedure, continuity of run-time estimates is provided during transition from inverter operation to the holdoff period, and the final $t_R(LINE)$ at the end of the holdoff period should be closer to the calculated $t_R(LINE)$ after the holdoff period if the output current has changed since inverter operation.

After the hold-off time, a new value of $K_3$ is calculated in accordance with:

$$K_3 = \frac{V_{B(OC)M} - V_B(INV)}{I_o(INV)}$$

where: $V_{B(OC)M}$ = measured open-circuit battery voltage or $V_{FC}$, whichever is lower. The $K_3$ value so calculated is substituted in subsequent calculations using $K_3$ if the following conditions are met (otherwise the old value of $K_3$ is used):

1) load current percent of full load $\geq 25\%$;
2) run-time on inverter is at least a selected period of time sufficient for the battery to stabilize (e.g., 30 seconds);
3) $t_R(INV)$ > low run-time alarm value;
4) $K_3$ changes by more than a selected minimum (e.g., 10/256 for an 8 bit word length). and
5)

$$\text{new } K_3 \leq \frac{V_{FC} - V_{LL}}{I_o(RATED)}$$

where $I_o(RATED)$ is the maximum rated output current from the UPS.

Then $V_{B(OC)C}$ is replaced with $V_{B(OC)M}$:

$$V_{B(OC)C} \leftarrow V_{B(OC)M}$$

At periodic intervals $\Delta t$, $V_{B(OC)C}$ is updated:

$$V_{B(OC)C} \leftarrow V_{B(OC)C} + K_4(\Delta t)$$

or equivalently $V_{B(OC)C}(t + \Delta t) = V_{B(OC)C}(t) + K_4(\Delta t)$
where:

$K_4$ = constant expressing the change in open-circuit battery voltage for a given time interval and is related to battery capacity and net battery charging current. Generally this constant is calculated from recharge data and is expressed in $\mu V/\text{sec}$.

$\Delta t$ = periodic calculation interval.

Then the following is calculated:

$$V_{BC} = V_{B(OC)C} - K_3 I_o(LINE)$$

where:

$V_{BC}$ = calculated battery terminal voltage.

$I_o(LINE)$ = RMS output current during line operation. Finally:

$$t_R(LINE) = \left[ K_1 + \frac{K_2}{I_o(LINE)} \right] \frac{(V_{BC} - V_{LL})^2}{(V_{FC} - V_{BC})}$$

The remaining run-time, $t_R(LINE)$ or $t_R(INV)$, is made available by the microprocessor 66 for display to the user through the user interface 80, with a warning signal automatically provided if the run-time drops below a preselected minimum level during inverter operation, and also may be made available by the microprocessor to ancillary equipment, such as a computer protected by the UPS, through the communications port 81 (e.g., an RS232 port). The following is an exemplary psuedo-code program carried out by the microprocessor 66 for determining run-time and updating the value of $K_3$ using scaling factors chosen to optimize resolution using an 8-bit microprocessor.

In the foregoing procedures, the measured values of $I_o(INV)$ and $I_o(LINE)$ are used to account for power being drawn by the load. It is apparent that total power consumed by the load, or battery current $I_B$ may be used during inverter operation to estimate output current for use in the expressions above, and will account for power drawn from the battery. During line operation, the power consumed by the load will be proportional to and can be used to estimate output current for use in the above expressions. It is apparent that output power, output current, and battery current can be used for this purpose and essentially differ from one another by constants. Thus, the value of $I_o(INV)$ can be determined as either the measured RMS current supplied to the load through the inverter, an estimate of the load current based on power consumed in the load and inverter, or an estimate of load current based on battery current.

RUNTIME:

```
. IF SHUTDOWN:
     RUNTIME = 0;
     VBAT_OC = VBATT;
     CHRG_ACC = 0;
     RNTM_LINE = FALSE;
     RNTM_ALARM = FALSE;
     EXIT;
  ENDIF
  IF INVERTER:
     VB_INV = VBATT:
```

$$RUNTIME_{INV} = \frac{\left(K1 + \frac{16*K2}{IO}\right)\left(\frac{(VBATT - LOBATT)\_2}{(VBMAX - VBATT)*10}\right)}{256}$$

```
     IF INVERTER_TIME < 30;
        INVERTER_TIME = INVERTER_TIME + 1;
     ELSE
        RNTM_LINE = FALSE;
     ENDIF
     IF RNTM_LINE;
        IF RUNTIME_INV > RUNTIME;
           GOTO RT_ALARM;
        ENDIF
     ENDIF
     RUNTIME = RUNTIME_INV;
     RNTM_LINE = FALSE:
     IF ! LOW_RUNTIME_ALARM && %LOAD >= 25% INVERTER_TIME >= 30;
        K3_COMPUTE = TRUE;
     ELSE
        K3_COMPUTE = FALSE;
     ENDIF
     CHRG_ACC = 0;
RT_ALARM:
     IF RUNTIME <= RNTMALARM*6;
        RNTM_ALARM = TRUE;
     ELSE
        IF RUNTIME > RNTMALARM*6 + 3;
           RNTM_ALARM = FALSE;
        ENDIF
     ENDIF
  ELSE
     IF  ! CHGR_DSBL && VBAT_OC < VBATT && VBAT_OC < VBMAX;
        CHRG_ACC = CHRG_ACC + K4
        IF   CHRG_ACC > 50000;
           VBAT_OC = VBAT_OC + 1; (ACTUAL UNITS = .1V)
           CHRG_ACC = CHRG_ACC - 50000
        ENDIF
     ENDIF
     IF VBAT_OC < VBMAX:
```

$$VB = VBAT\_OC - \frac{K3*IO}{256}$$

```
     ELSE
```

$$VB = VBMAX - \frac{K3*IO}{256}$$

```
     ENDIF
```

$$RUNTIME = \frac{\left(K1 + \frac{16*K2}{IO}\right)\left(\frac{(VB - LOBATT)\_2}{(VBMAX - VB)*10}\right)}{256}$$

```
     RNTM_LINE = TRUE;
     RNTM_ALARM = FALSE:
  ENDIF
K3 COMPUTATION:
  FOLLOWING TRANSFER FROM INVERTER TO LINE:
```

$$VBAT\_OC = VB_{INV} + \frac{K3*IO}{256}$$

```
  IO_INV = IO;
  IF K3_COMPUTE:  (LAST RUN-TIME ON INVERTER MET THE
                   FOLLOWING CRITERIA:
                   %LOAD >= 25%
                   RNTM_LINE == FALSE
```

```
            INVERTER_TIME >= 30 SECONDS
            LOW_RNTM_ALARM = FALSE
    DISABLE CHARGER FOR 1 MINUTE
    IF VBATT > VBMAX:
        VBAT_OC = VBMAX;
    ELSE
        VBAT_OC = VBATT;
    ENDIF
```

$$K3_{NEW} = \frac{(VBAT\ OC - VB_{INV})*256}{IO_{INV}};$$

```
    IF K3_NEW > 10 && |K3_NEW - K3_OLD| > 10 &&
        LOBATT + K3_NEW * I_PULL_LOAD/256 <= VBMAX;
        K3 = K3_NEW
    ENDIF
ENDIF
```

Figure 2:
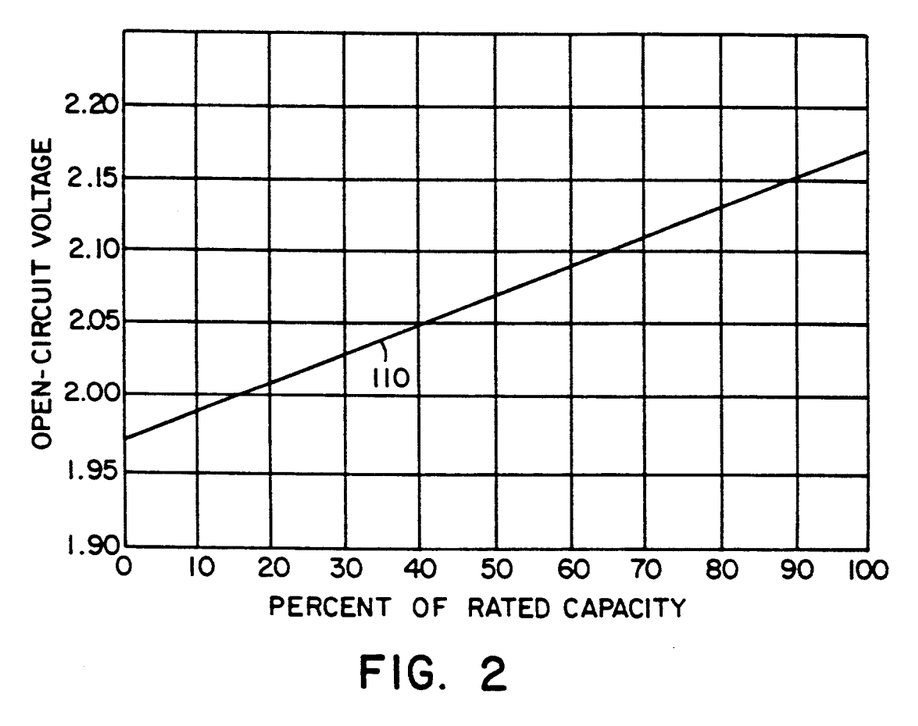
FIG. 2 is a graph illustrating the typical linear relationship between open circuit battery voltage and state of charge of the battery.
Figure 3:
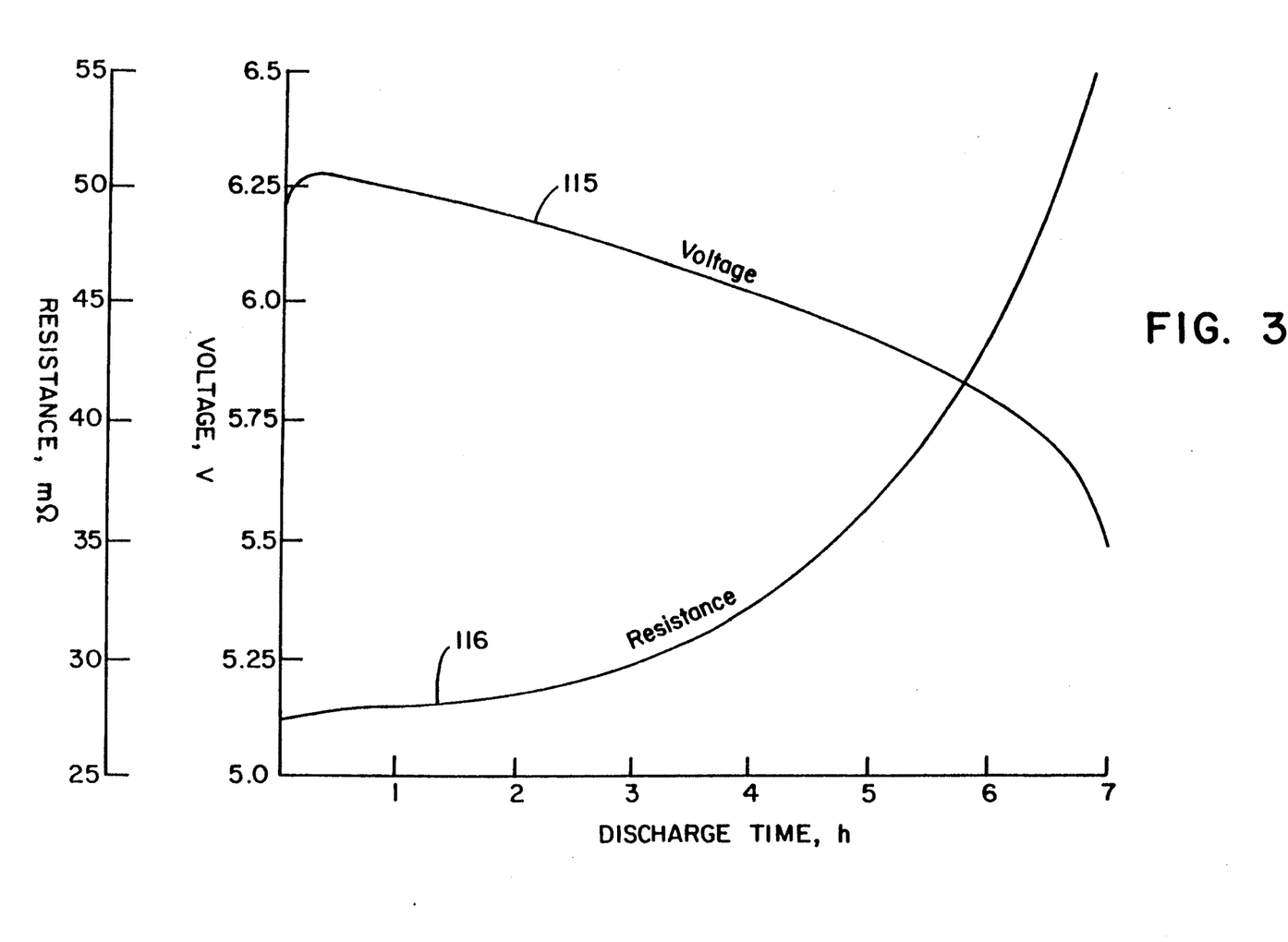
FIG. 3 are graphs illustrating battery resistance and battery voltage over time during discharge.
Figure 4:
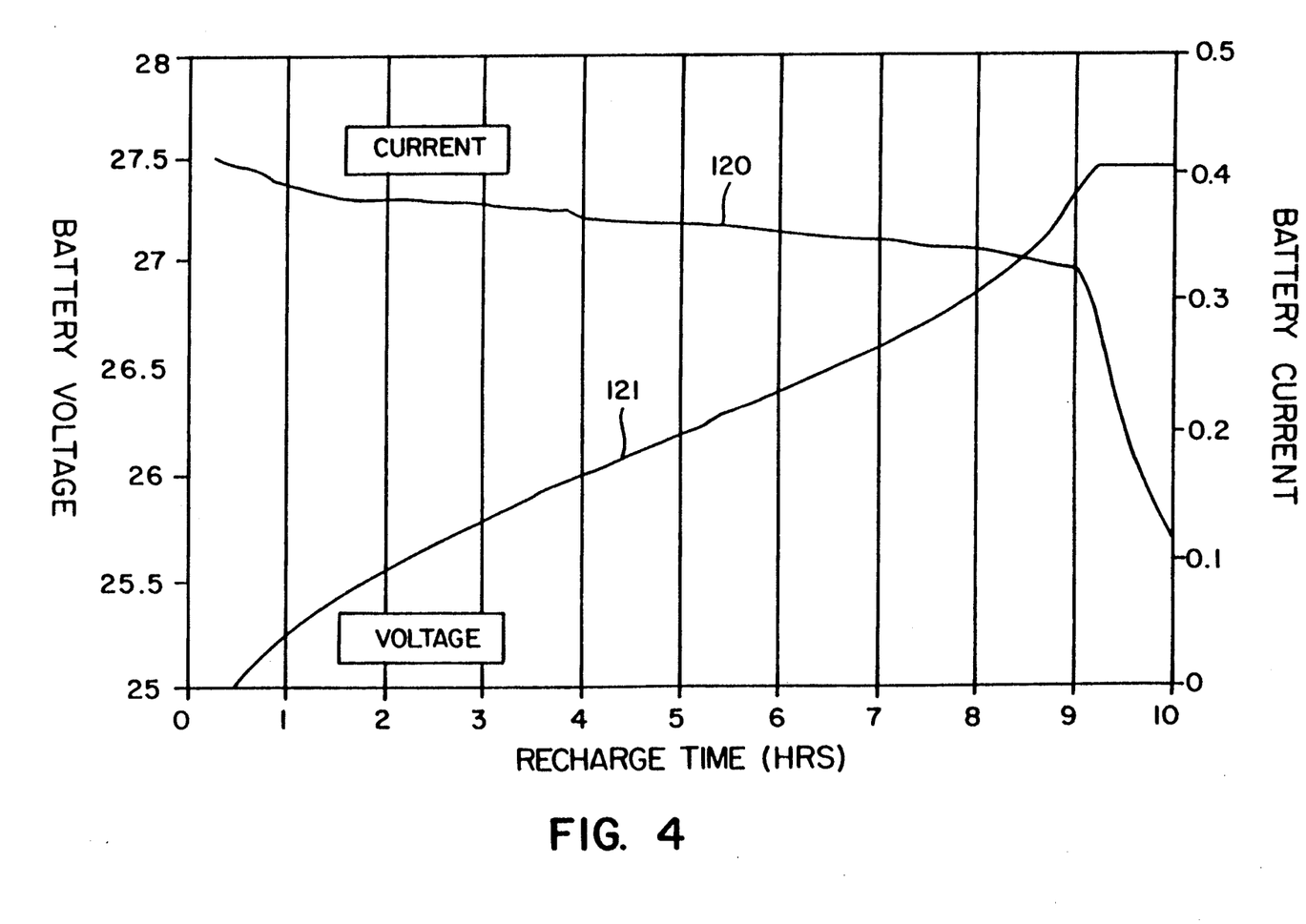
FIG. 4 are graphs illustrating typical charging current and battery voltage over time during charge.
Figure 5:
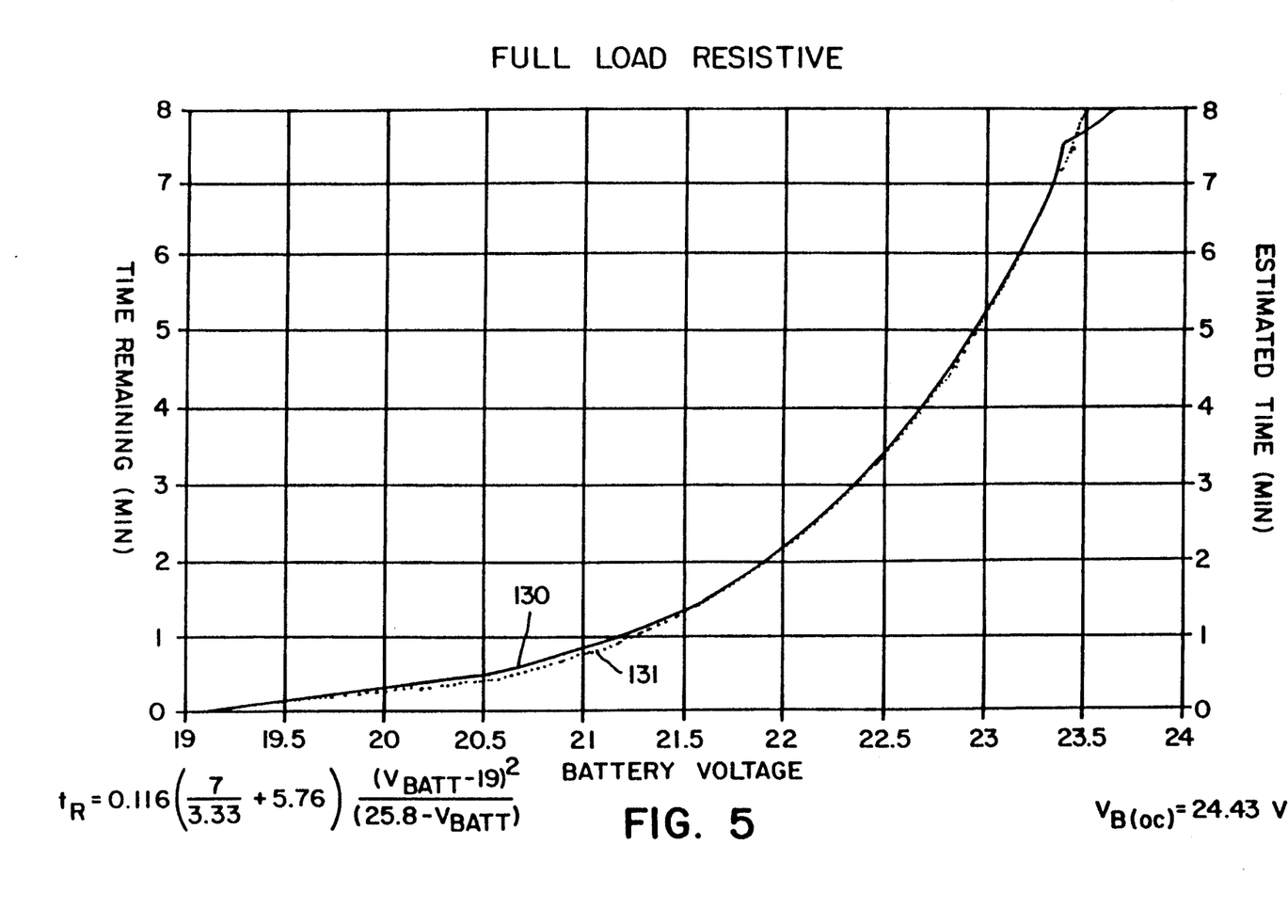
FIG. 5 are graphs of actual run-time of a battery and estimated run-time in accordance with the present invention under full load (resistive) conditions.
Figure 6:
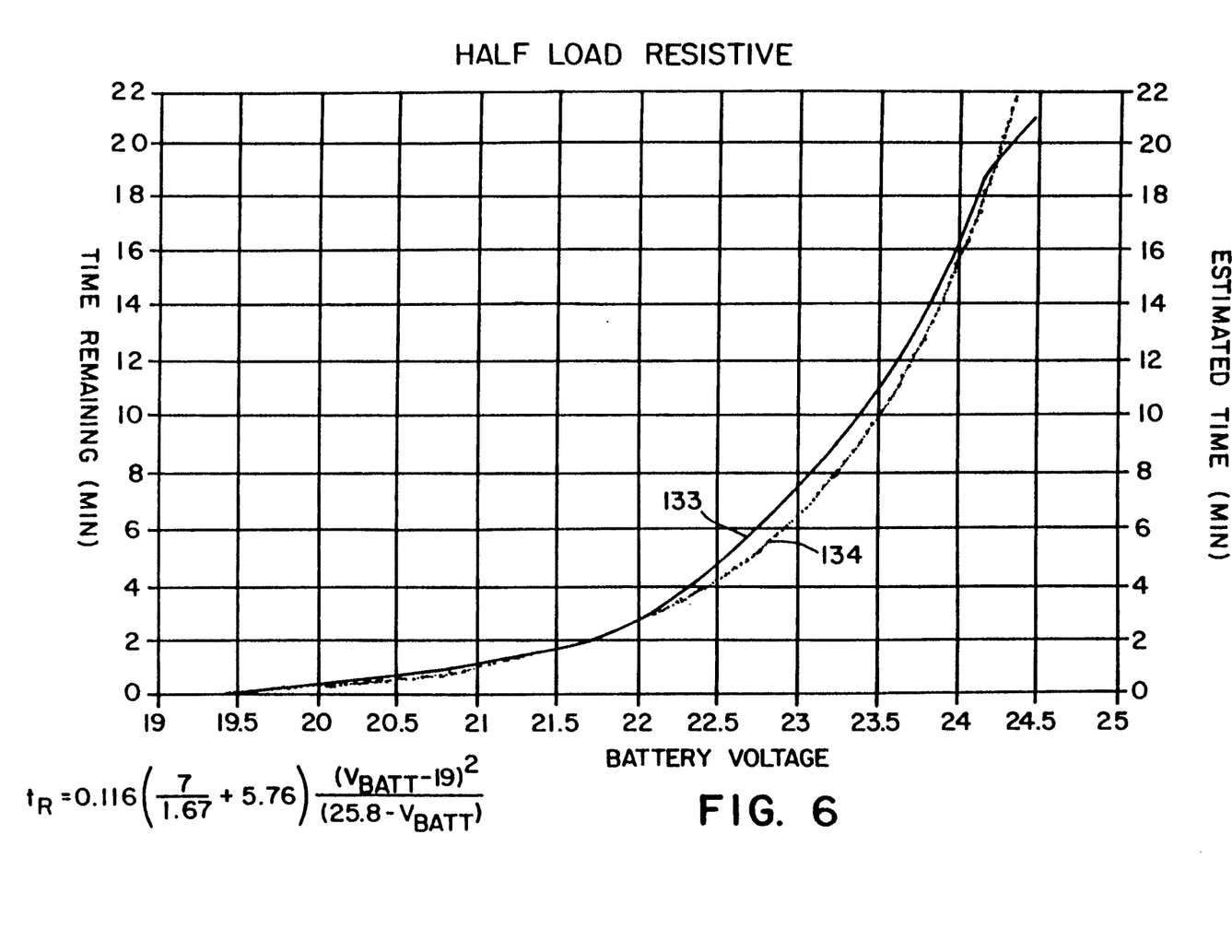
FIG. 6 are graphs of actual run-time of a battery and estimated run-time in accordance with the present invention under half load (resistive) conditions.

The graph 110 of FIG. 2 illustrates the typical linear relationship between open circuit battery voltage and state of charge for an exemplary sealed lead-acid battery. This linear relationship allows estimations of run-time to be made with reasonable accuracy. Typical relationships between battery voltage and resistance during battery discharge are shown by the graphs 115 and 116, respectively, of FIG. 3. These graphs illustrate that battery resistance increases fairly slowly until deep discharge is reached, a condition seldom encountered during UPS operations. Consequently, the calculation of $K_3$ as described above during line operation will have satisfactory accuracy. FIG. 4 shows graphs 120 and 121 of current and voltage, respectively, versus recharge time for a typical sealed lead-acid battery. These data may be used to determine the constant $K_4$ for the battery being utilized in the UPS. FIG. 5 shows graphs of actual (130) and predicted (131) run-time remaining for various values of measured battery voltage with a full resistive load. The graphs 133 and 134 of FIG. 6 show similar actual and predicted values of run-time for a half resistive load. In these estimates, the values of $K_1$ and $K_2$ for the particular UPS and battery used were chosen to be $K_1 = 5.76$ and $K_2 = 7.0$. The expressions for calculation of run-time described above are selected to closely fit these experimental data, as is illustrated in FIGS. 5 and 6. In the present invention, the use of the constant term $K_1$, in addition to the term $$\frac{K_2}{I_o(INV)} \text{ or } \frac{K_2}{I_o(LINE)}$$

in the expression for $t_R(INV)$ or $t_R(LINE)$ yields a more accurate prediction of run-time and a closer fit to experimental run-time data.

It is understood that the invention is not confined to the particular embodiments set forth herein as illustrative, but embraces such forms thereof as come within the scope of the following claims.

What is claimed is:

1. A method of determining the run-time during which power can be supplied from a battery through an inverter of an uninterruptible power supply to a load while such power is being supplied to the load, comprising the steps of:
   (a) determining the current supplied to the load;
   (b) measuring the battery voltage while the battery supplies power to the load;
   (c) determining the remaining run-time $t_R(INV)$ available during which the battery can supply power to the load in accordance with the expression $$t_R(INV) = \left[K_1 + \frac{K_2}{I_o(INV)}\right] \frac{(V_B - V_{LL})^2}{(V_{FC} - V_B)}$$

where:
$K_1$ and $K_2$ are predetermined constants,
$V_{LL}$ is the lower limit of battery voltage below which the battery should not supply power,
$V_{FC}$ is the full charge voltage of the battery,
$V_B$ the measured battery voltage while the battery supplies power to the load, and
$I_o(INV)$ is the RMS current supplied to the load.

2. The method of claim 1 wherein the value of $I_o(INV)$ is determined as either the measured RMS current supplied to the load through the inverter, an estimate of load current based on power consumed in the load and inverter, or an estimate of load current based on battery current.

3. The method of claim 1 wherein the remaining run-time is redetermined periodically at regular intervals.

4. The method of claim 1 including the step of providing a display to an operator of the remaining run-time.

5. The method of claim 3 wherein before power is supplied by the uninterruptible power supply from the battery to the load, power is supplied from an AC power system to the load, and including the steps of:
   (1) recharging the battery with power from the AC power system;
   (2) determining an available run-time $t_R(LINE)$ while power is provided from the AC power system to the load and the battery is being recharged;
   (3) then, when power from the AC power system is no longer supplied to the load and power from the battery is being supplied to the load, displaying the run-time $t_R(INV)$ in accordance with the expression $$t_R(INV) = \left(K_1 + \frac{K_2}{I_o(INV)}\right) \frac{(V_B - V_{LL})^2}{(V_{FC} - V_B)}$$

if $t_R(INV)$ as so determined is less than $t_R(LINE)$ or if the length of time that power has been supplied from the battery through the inverter to the load is greater than a selected period of time, and, if not, then displaying the run-time $t_R(INV)$ as equal to $t_R(LINE)$.

6. The method of claim 5 wherein the selected period of time is 30 seconds.

7. The method of claim 1 including the additional steps of
   (1) determining when power is available from the AC power system, and then measuring and storing the then existing values of the load current $I_{oO}(INV)$ and battery voltage $V_B(INV)$,
   (2) discontinuing the supply of power from the battery to the load and supplying power from the AC power system to the load;
   (3) measuring the open circuit battery voltage $V_{B(OC)M}$ after power is no longer supplied from the battery to the load;
   (4) then recharging the battery at a known rate from the AC power system;
   (5) determining the RMS current $I_o(LINE)$ supplied to the load;
   (6) determining a constant $K_3$ after power is no longer supplied from the battery to the load in accordance with the following expression:

$$K_3 = \frac{V_{B(OC)M} - V_B(INV)}{I_o(INV)}$$

(7) determining an estimate $V_{B(OC)C}$ of the open circuit battery voltage which is initially equal to $V_{B(OC)M}$ and is updated at selected periodic intervals $\Delta t$ such that at a time $t+\Delta t$, $V_{B(OC)C}$ is determined as $$V_{B(OC)C}(t+\Delta t) = V_{B(OC)C}(t) + K_4 \Delta t$$

where $K_4$ is a predetermined constant indicative of the rate of recharge of the battery;
   (8) then determining an estimated battery voltage under load $V_{BC}$ in accordance with the expression $$V_{BC} = V_{B(OC)C} - K_3 I_o(LINE)$$

(9) then determining the estimated run-time $t_R(LINE)$ during supply of power to the load from the AC power system in accordance with the expression:

$$t_R(LINE) = \left(K_1 + \frac{K_2}{I_o(LINE)}\right) \frac{(V_{BC} - V_{LL})^2}{(V_{FC} - V_{BC})}.$$

8. The method of claim 7 including the step of displaying to an operator the estimated remaining run-time $t_R(LINE)$ during supply of power to the load from the AC power system.

9. The method of claim 7 wherein there is a previous value of $K_3$ which is used as the value of $K_3$ if any of the following conditions are not met:
   the percentage of load power drawn is greater than 25% of full load power,
   the time during which the inverter was run and power was supplied by the battery was greater than or equal to a selected period of time,
   the last run-time $t_R(INV)$ estimated during inverter operation is greater than a selected low run-time alarm value,
   the new calculated $K_3$ changes from the previous value of $K_3$ by more than a selected minimum, or the new $K_3$ is less than or equal to $$\frac{V_{FC} - V_{LL}}{I_o(RATED)}$$

where $I_o(RATED)$ is the maximum rated load current that can be drawn from the inverter.

10. The method of claim 7 wherein the remaining run-time $t_R(LINE)$ during supply of power to the load from the AC power system is determined periodically at regular intervals.

11. A method of determining the run-time during which power can be supplied from a battery through an inverter of an uninterruptible power supply to a load while power is being supplied to the load from an AC power system, comprising the steps of:
   (a) measuring the open circuit voltage $V_{B(OC)M}$ of the battery when the battery is not being charged and is not supplying power to a load;
   (b) then charging the battery at a known rate from the AC power system;
   (c) estimating a new open circuit battery $V_{B(OC)C}$ voltage while the battery is recharging based on the measured open circuit battery voltage $V_{B(OC)M}$ and the length of time t the battery has been recharged;
   (d) determining the RMS current $I_o(LINE)$ being supplied to the load;
   (e) estimating the battery voltage $V_{BC}$ under load conditions as the estimated open circuit voltage $V_{B(OC)C}$ minus a value equal to the load current $I_o(LINE)$ times a selected constant;
   (f) determining the estimated run-time $t_R(LINE)$ based on the load current $I_o(LINE)$, the estimated battery voltage $V_{BC}$ under load, the lower limit of battery voltage $V_{LL}$, and the full charge battery voltage $V_{FC}$.

12. The method of claim 11 wherein the estimated run-time $t_R(LINE)$ is determined in accordance with the following expression:

$$t_R(LINE) = \left(K_1 + \frac{K_2}{I_o(LINE)}\right) \frac{(V_{BC} - V_{LL})^2}{(V_{FC} - V_{BC})}$$

where $K_1$ and $K_2$ are predetermined constants, and $I_o(LINE)$ is a measured value of RMS current supplied to the load or an estimate of load current based on power consumed in the load.

13. The method of claim 11 including the step of providing a display to an operator of the remaining run-time.

14. The method of claim 11 wherein the remaining run-time is redetermined periodically at regular intervals.

15. The method of claim 11 wherein the estimate $V_{B(OC)C}$ of the open circuit battery voltage is initially equal to $V_{B(OC)M}$ and is updated at selected periodic intervals $\Delta t$ such that at a time $t+\Delta t$, $V_{B(OC)C}$ is determined as $$V_{B(OC)C}(t+\Delta t) = V_{B(OC)C}(t) + K_4 \Delta t$$

where $K_4$ is a predetermined constant indicative of the rate of recharge of the battery.

16. The method of claim 11 wherein the estimated battery voltage under load $V_{BC}$ is determined as $$V_{BC} = V_{B(OC)C} - K_3 I_o(LINE)$$

where $$K_3 = \frac{V_{B(OC)M} - V_B(INV)}{I_o(INV)}$$

and $V_B(INV)$ = a measured battery voltage before switching from inverter to AC power system power,
$I_B(INV)$ = a measured RMS load current before switching from inverter to AC power system power,
$V_{B(OC)M}$ = measured open circuit battery voltage.

17. A method of operating an uninterruptible power supply and determining the run-time during which power can be supplied from a battery through an inverter of the uninterruptible power supply to a load while power is being supplied to the load from an AC power system, comprising the steps of:

(a) supplying power to the load from the battery through the inverter when power is not available from the AC power system;

(b) determining when power is available from the AC power system, and then determining and storing the then existing values of the load current $I_o(INV)$ and battery voltage $V_B(INV)$, (c) discontinuing the supply of power from the battery to the load and supplying power from the AC power system to the load;

(d) measuring the open circuit battery voltage $V_{B(OC)M}$ after power is no longer supplied from the battery to the load;

(e) then recharging the battery at a known rate from the AC power system;

(f) determining the RMS current $I_o(LINE)$ supplied to the load;

(g) determining a constant $K_3$ after power is no longer supplied from the battery to the load in accordance with the following expression:

$$K_3 = \frac{V_{B(OC)M} - V_B(INV)}{I_o(INV)}$$

where $V_{(B(OC)M}$ is measured open circuit battery voltage;

(h) determining an estimate $V_{B(OC)C}$ of the open circuit battery voltage which is initially equal to $V_{B(OC)M}$ and is updated at selected periodic intervals $\Delta t$ to such that at a time $t+\Delta t$, $V_{B(OC)C}$ is determined as $$V_{B(OC)C}(t+\Delta t) = V_{B(OC)C}(t) + K_4 \Delta t$$

where $K_4$ is a predetermined constant indicative of the rate of recharge of the battery;

(i) then determining an estimated battery voltage under load $V_{BC}$ in accordance with the expression $$V_{BC} = V_{B(OC)C} - K_3 I_o(LINE)$$

(j) then determining the estimated run-time $t_R(LINE)$ during supply of power to the load from the AC power system in accordance with the expression:

$$t_R(LINE) = \left(K_1 + \frac{K_2}{I_o(LINE)}\right) \frac{(V_{BC} - V_{LL})^2}{(V_{FC} - V_{BC})}$$

where $V_{LL}$ is the lower limit of battery voltage below which the battery should not supply power, and $K_1$ and $K_2$ are predetermined constants.

18. The method of claim 17 including the step of displaying to an operator the estimated remaining run-time $t_R(LINE)$ during supply of power to the load from the AC power system.

19. The method of claim 17 wherein there is a previous value of $K_3$ which is used as the value of $K_3$ if any of the following conditions are not met:

the percentage of load power drawn is greater than 25% of full load power, the time during which the inverter was run and power was supplied by the battery was greater than or equal to a selected period of time, the last run-time $t_R(INV)$ estimated during inverter operation is greater than a low run-time alarm value, the new calculated $K_3$ changes from the previous value of $K_3$ by more than a selected minimum, or the new $K_3$ is less than or equal to $$\frac{V_{FC} - V_{LL}}{I_o(RATED)}$$

where $I_o(RATED)$ is the maximum rated load current that can be drawn from the inverter.

20. The method of claim 17 wherein the remaining run-time $t_R(LINE)$ during supply of power to the load from the AC power system is determined periodically at regular intervals.

21. An uninterruptible power system connectible to AC power system lines at its input terminals and to a load at its output terminals, comprising:

(a) an auxiliary power supply battery;

(b) a power supply path from the input terminals to the output terminals to normally supply power from an AC power system connected to the input terminals to a load connected to the output terminals;

(c) means, including an inverter, responsive to control signals for interrupting the supply of power through the power supply path from the AC power system lines to the load and for selectively providing AC power from the battery to the power supply path through the inverter and thence to the load;

(d) control means for providing control signals, upon occurrence of a line fault on the AC power system lines, to the means responsive to control signals to cause the supply of power to the load to be transferred from the AC power system to the battery and from the battery back to the AC power system when power is available therefrom, the control means further including means for determining the current supplied to the load during supply of power to the load from the battery, (e) means for measuring the battery voltage while the battery supplies power to the load, and (f) means for determining the remaining run-time $t_R(INV)$ available during which the battery can supply power to the load in accordance with the expression $$t_R(INV) = \left[K_1 + \frac{K_2}{I_o(INV)}\right]\frac{(V_B - V_{LL})^2}{(V_{FC} - V_B)}$$

where:

$K_1$ and $K_2$ are predetermined constants, $V_{LL}$ is the lower limit of battery voltage below which the battery should not supply power, $V_{FC}$ is the full charge voltage of the battery, $V_B$ is the measured battery voltage while the battery supplies power to the load, and $I_o(INV)$ is the RMS current supplied to the load.

22. The system of claim 21 wherein the value of $I_o(INV)$ is determined by the control means as either measured RMS current supplied to the load through the inverter, an estimate of load current based on power consumed in the load and inverter, or an estimate of load current based on battery current.

23. The system of claim 21 including means for providing a display to an operator of the remaining run-time.

24. The system of claim 21 wherein the control means redetermines the remaining run-time periodically at regular intervals.

25. The system of claim 21 wherein the control means further includes means for, determining when power is available from the AC power system, and then measuring and storing the then existing values of the load current $I_o(INV)$ and battery voltage $V_B(INV)$, for discontinuing the supply of power from the battery to the load and supplying power from the AC power system to the load; for measuring the open circuit battery voltage $V_{B(OC)M}$ after power is no longer supplied from the battery to the load, for recharging the battery at a known rate from the AC power system, for determining the RMS current $I_o(LINE)$ supplied to the load, for determining a constant $K_3$ after power is no longer supplied from the battery to the load in accordance with the following expression:

$$K_3 = \frac{V_{B(OC)M} - V_B(INV)}{I_o(INV)},$$

determining an estimate $V_{B(OC)C}$ of the open circuit battery voltage which is initially equal to $V_{B(OC)M}$ and is updated at selected periodic intervals $\Delta t$ such that at a time $t + \Delta t$, $V_{B(OC)C}$ is determined as $$V_{B(OC)C}(t+\Delta t) = V_{B(OC)C}(t) + K_4 \Delta t$$

where $K_4$ is a predetermined constant indicative of the rate of recharge of the battery, for then determining an estimated battery voltage under load $V_{BC}$ in accordance with the expression $$V_{BC} = V_{B(OC)C} - K_3 I_o(LINE)$$

and for then determining the estimated run-time $t_R(LINE)$ during supply of power to the load from the AC power system in accordance with the expression:

$$t_R(LINE) = \left(K_1 + \frac{K_2}{I_o(LINE)}\right)\frac{(V_{BC} - V_{LL})^2}{(V_{FC} - V_{BC})}.$$

26. The system of claim 25 including means for displaying to an operator the estimated remaining run-time $t_R(LINE)$ during supply of power to the load from the AC power system.

27. The system of claim 26 wherein there is a previous value of $K_3$ which is used as the value of $K_3$ if any of the following conditions are not met:

the percentage of load power drawn is greater than 25% of full load power, the time during which the inverter was run and power was supplied by the battery was greater than or equal to a selected period of time, the last run-time $t_R(INV)$ estimated during inverter operation is less than a selected low run-time alarm value, the new calculated $K_3$ changes from the previous value of $K_3$ by more than a selected minimum, or the new $K_3$ is greater than or equal to $$\frac{V_{FC} - V_{LL}}{I_o(RATED)}$$

where $I_o(RATED)$ is the maximum rated load current that can be drawn from the inverter.

28. The system of claim 26 wherein the control means determines the remaining run-time $t_R(LINE)$ during supply of power to the load from the AC power system periodically at regular intervals.

29. An uninterruptible power system connectible to AC power system lines at its input terminals and to a load at its output terminals, comprising:

(a) an auxiliary power supply battery;

(b) a power supply path from the input terminals to the output terminals to normally supply power from an AC power system connected to the input terminals to a load connected to the output terminals;

(c) means, including an inverter, responsive to control signals for interrupting the supply of power through the power supply path from the AC power system lines to the load and for selectively providing AC power from the battery to the power supply path through the inverter and thence to the load;

(d) charger means for recharging the battery;

(e) control means for providing control signals, upon occurrence of a line fault on the AC power system lines, to the means responsive to control signals to cause the supply of power to the load to be transferred from the AC power system to the battery and from the battery back to the AC power system when power is available therefrom, the control means further including means for measuring the open circuit voltage $V_{V(OC)M}$ of the battery when the battery is not being charged and is not supplying power to a load, then controlling the charger means to charge the battery at a known rate from the AC power system; and further for estimating a new open circuit battery voltage $V_{B(OC)C}$ while the battery is recharging based on the measured open circuit battery voltage $V_{B(OC)M}$ and the length of time t the battery has been recharged, determining the RMS current $I_o(LINE)$ being supplied to the load, estimating the battery voltage $V_{BC}$ under load conditions as the estimated open circuit voltage $V_{B(OC)C}$ minus a value equal to the load current $I_o(LINE)$ times a constant, and determining the estimated run-time $t_R(LINE)$ based on the load current $I_o(LINE)$, the estimated battery voltage $V_{BC}$ under load, the lower limit of battery voltage $V_{LL}$, and the full charge battery voltage $V_{FC}$.

30. The system of claim 29 wherein the estimated run-time $t_R(LINE)$ is determined by the control means in accordance with the following expression:

$$t_R(LINE) = \left(K_1 + \frac{K_2}{I_o(LINE)}\right)\frac{(V_{BC} - V_{LL})^2}{(V_{FC} - V_{BC})}$$

where $K_1$ and $K_2$ are predetermined constants and $I_o(LINE)$ is measured by the control means or estimated based on power supplied to the load.

31. The system of claim 29 including means for providing a display to an operator of the remaining run-time.

32. The system of claim 29 wherein the remaining run-time is redetermined by the control means periodically at regular intervals.

33. The system of claim 29 wherein the control means initially estimates $V_{B(OC)C}$, the open circuit battery voltage, as equal to $V_{B(OC)M}$ and then updates the estimate at selected periodic intervals $\Delta t$ such that at a time $t+\Delta t$, $V_{B(OC)C}$ is determined as $$V_{B(OC)C}(t+\Delta t) = V_{B(OC)C}(t) + K_4 \Delta t$$

where $K_4$ is a predetermined constant indicative of the rate of recharge of the battery.

34. The system of claim 29 wherein the estimated battery voltage under load $V_{BC}$ is determined by the control means as $$V_{BC} = V_{B(OC)C} - K_3 I_o(LINE)$$

where $$K_3 = \frac{V_{B(OC)M} - V_B(INV)}{I_o(INV)}$$

and $V_B(INV)$ = a measured battery voltage before switching from inverter to AC power system power, $I_B(INV)$ = a measured RMS load current before switching from inverter to AC power system power, $V_{B(OC)M}$ = measured open circuit battery voltage.

* * * * *